SIGNAL DURATION CHECKING CIRCUIT

Filed July 22, 1965 2 Sheets-Sheet 1

INVENTOR
G. L. BORING
BY Howard R. Popper
ATTORNEY

CALIBRATION AND TEST PULSE TRAINS

MINIMUM PERCENT BREAK (CALIBRATION : 60%)

United States Patent Office 3,410,967

Patented Nov. 12, 1968

3,410,967

SIGNAL DURATION CHECKING CIRCUIT

George L. Boring, Metuchen, N.J., assignor to Bell Telephone Laboratories Incorporated, New York, N.Y., a corporation of New York Filed July 22, 1965, Ser. No. 473,958
13 Claims. (Cl. 179—175.2)

ABSTRACT OF THE DISCLOSURE

A pulse analyzation circuit is disclosed for testing the make-to-break ratio of any or each pulse of a continuous pulse train. An out-of-tolerance pulse is signaled by energizing an alarm actuated by a differential in the charge stored on two capacitors. One capacitor is charged during the make interval of a pulse, the other is charged during the entire pulse. A variable time constant is provided in one path so that the charge accumulated during the make period can be adjusted to equal the charge accumulated during the entire pulse if the make-to-break ratio of the tested pulse is within proper limits.

Figure 1:
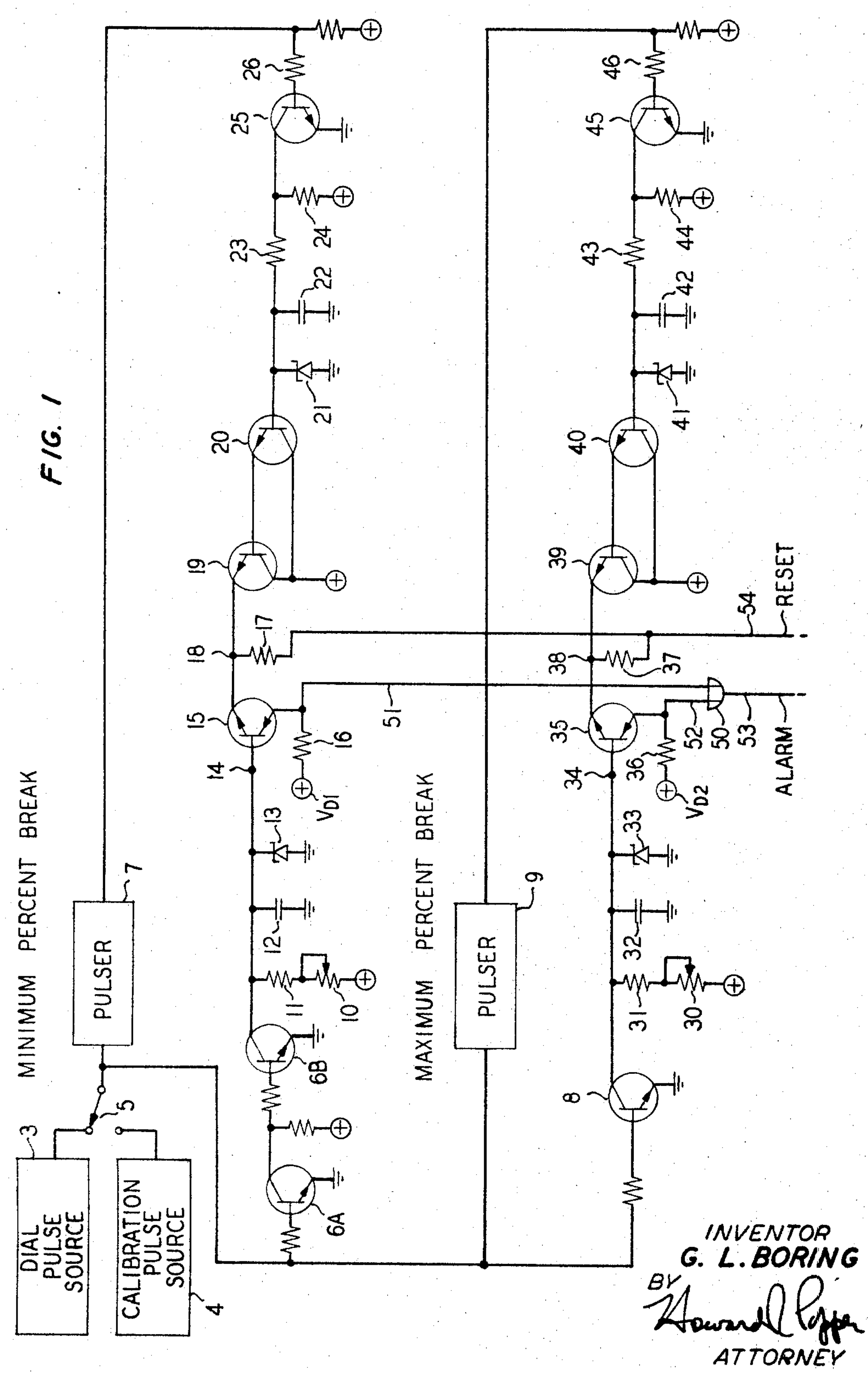

This invention relates to measuring circuits in general and more particularly, to a circuit for checking on the accuracy and integrity of pulse signals.

Most of the electronic and communication systems in wide use today and the component parts thereof, require energizing signals which must meet certain prescribed limits as to time duration, spacing, signal level, etc. If these limits are not met, erroneous operation most likely results. Computer systems particularly require very specific types of signals for proper write, storage and read cycles, and telephone systems, where increasing reliance is being placed upon the subscriber himself to initiate long distance connections merely by operation of the telephone set dial, also require signals to be transmitted within predetermined tolerances.

One particularly important parameter of pulses such as dial pulses, for example, is the so-called percent break figure. The percent break figure is the ratio of the time during which a particular dial pulsing contact is open ("break") to the total time duration of a dial pulse ("break"+"make" intervals) during which the contact is first open and then closed. These portions are occasionally referred to by the names "mark" and "space" (corresponding to make and break respectively) in related areas of interest, but the preferred terminology of make and break intervals will be used herein.

Although prior art arrangements are known which are capable of measuring the average percent break of the pulses in a continuous train, these circuits do not take into account the percent break characteristics of a single or individual pulse. (The word pulse is used here in the sense of a complete make and break intervals.) Although an average percent break reading may be adequate in testing some circuitry, it ignores the single abnormal pulse which does not meet the prescribed percent break tolerances.

More specifically, if in a series of ten dial pulses, nine of these pulses meet the prescribed minimum percent break of, say 60 percent, while one pulse is too low at 55 percent, prior art arrangements which merely give an average indication would not recognize that one entire pulse in this pulse train is out of tolerance. Allowing such a pulse to remain undetected could jeopardize the operation and reliability of sophisticated electronic systems. Moreover, most prior art equipment also requires a series of pulses to produce any reading at all due to reliance on information output devices and meters of various kinds having mechanical inertia which must be overcome. In certain situations, however, far fewer pulses (and perhaps only a single pulse) may be available for testing and in these situations, such prior art techniques are inadequate.

It is therefore an object of this invention to furnish an improved signal measuring circuit.

It is a further object of this invention to provide such a circuit which is responsive to individual input signals.

Another object of this invention is to allow for the detection of such signals the characteristics of which fall outside of certain predetermined tolerance limits.

These objects and other objects are fulfilled in one particular embodiment of the invention wherein maximum and minimum percent break limits are established by a relatively simple calibration. During calibration, an "ideal" input signal which precisely meets the predetermined tolerances is presented to the circuit. The circuit is adjusted so that any subsequent signals to be tested must fall within the established limits, otherwise an alarm circuit will be triggered. In using an electronic approach, the invention also avoids all of the mechanical inertia problems referred to above as existing in the prior art.

The circuit operates on an analog basis by which comparisons are made between waveforms which are derived from or related to different portions of any of the pulses of, for example, a dial pulse train. It will be shown below that arithmetically, a comparison of particular voltage waveforms at given instants of time actually establishes tolerances for the desired parameter, i.e., percent break.

The circuit of the illustrative embodiment is divided into two halves. One half checks pulses for minimum percent break while the other half checks pulses for maximum percent break. For the purposes of the following description, pulse intervals will be understood as commencing with the break interval. Considering the minimum percent break half of the circuit, a first voltage waveform, based upon the charging of a capacitor during the ensuing make interval, is applied as one of two inputs to a comparator. This capacitor will be permitted to charge for a time interval much smaller than the time constant of its charging circuit so that the waveform of its voltage build-up is a ramp function. The charging time interval of this first voltage waveform is ended at the conclusion of the make interval. The other input to the comparator is a voltage waveform whose development commenced at the beginning of the break interval preceding the make interval. This other input is developed across a capacitor which charges throughout the entire dial pulse interval; that is, it is charged continuously during both the break and make intervals, commencing with the break interval. The comparator is arranged to be activated if the first voltage waveform exceeds the second voltage waveform in magnitude at any given instant of time. In the illustrative embodiment of the invention, the comparator includes a PNPN transistor which is turned on when the magnitude of the first waveform exceeds the magnitude of the second waveform by a desired threshold voltage.

To calibrate the circuit to detect an out of tolerance break interval, an "ideal" dial pulse train is first applied to the above-mentioned capacitors. The time constant of the first capacitor's charging circuit is adjusted so that the magnitude (at the end of the make interval) of its voltage waveform will be practically equal to the magnitude (also at the end of the make interval) of the voltage waveform finally developed across the second capacitor. Accordingly, the calibrating waveform just avoids triggering the comparator transistor. When dial pulses are thereafter applied, any of which has a break interval below the calibrated minimum, the magnitude of the first voltage waveform will exceed that of the second at some point during the make interval by an amount sufficient to forward bias the comparator transistor and thus turn it on and energize an alarm circuit. The lower half of the circuit dealing with maximum percent break operates in a corresponding similar fashion and will be referred to only briefly below.

It is accordingly a feature of the present invention to determine the percentage duration of a particular portion of a pulse by detecting when a voltage proportional to the duration of the particular pulse portion equals a voltage proportional to the interval of the entire pulse.

It is another feature of the present invention to provide a circuit in which the rate of build-up of the voltage corresponding to the duration of a particular pulse portion may be selectively adjusted.

It is a further feature of the present invention to provide a pulse portion percentage duration indicating apparatus which triggers an alarm for pulses having a particular portion whose duration is less than a minimum or greater than a maximum percentage of the total pulse duration.

Additional objects and features of this invention will become apparent when taken in conjunction with the specification, the appended claims and the drawing in which:

FIG. 1 is an illustrative embodiment of circuitry to measure percent break in accordance with the invention; and FIG. 2 shows a series of sample waveforms at critical points in the circuit of FIG. 1.

As mentioned previously, and as can now be seen by reference to FIG. 1, the circuit is divided into two similar halves, the upper half measuring minimum percent break and the lower half measuring maximum percent break. Since the operation of the lower half of the circuit is so closely related to that of the upper half, only the upper half will be described in detail.

The dial pulse inputs to the transistor 6A and the pulser 7 will usually be from a source of dial pulse 3 which it is desired to test. Initially, however, the signals from calibration source 4 are applied to establish the tolerance limits which must later be met by the dial pulse inputs to be tested. (Changing from pulse source 3 to calibration source 4 is achieved by means of symbolic switch 5). For example, referring to FIG. 2, suppose that a minimum of 60 percent break is established as the required minimum. These are the characteristics of the calibration pulse train input shown in solid line in FIG. 2A and this input is fed to both elements 6A and 7 during the calibration cycle. It should be pointed out at this time that the critical points of comparison in the upper half of the circuit are terminals 14 and 18, the former being the base or control electrode of comparator PNPN transistor 15 and the latter being its output electrode. An alarm condition is postulated to exist when transistor 15 triggers on, thereby energizing alarm lead 53 through OR gate 50.

Figures 2A, 2B, 2C, 2D, 2E, 2F:
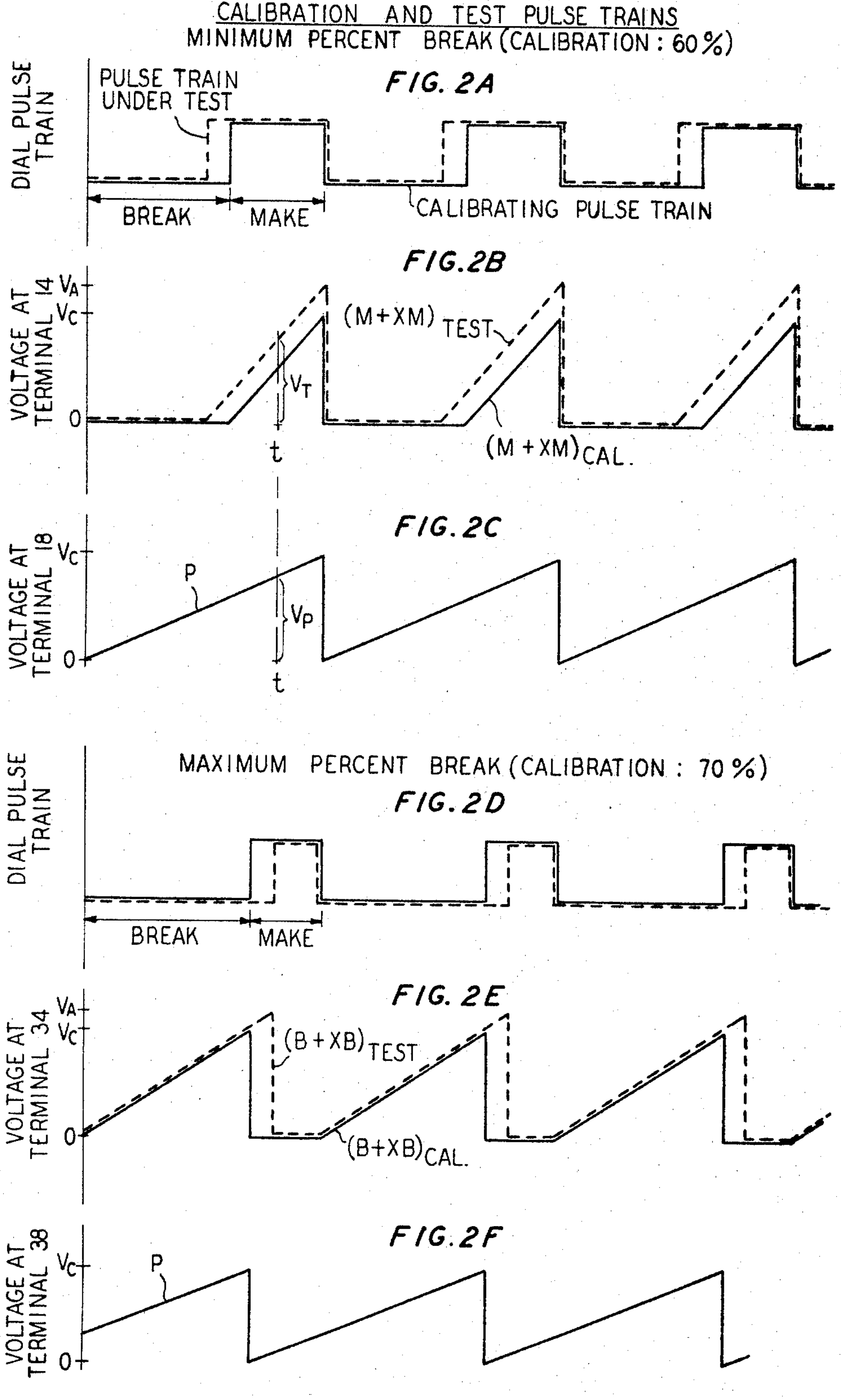

The first input waveform which has been referred to above as a function of the make interval duration is that which appears at terminal 14. The waveform at that point "follows" the waveform across critical charging capacitor 12. For the purposes of this invention, it is required that capacitor 12 charge up during the make interval and then discharge immediately upon the commencement of the break interval. (Zener diodes 13, 21, 33 and 41 limit the voltages across respective capacitors 12, 22, 32, and 42.) The charging path of capacitor 12 is from positive battery through adjustable resistor 10 and resistor 11 and to ground through capacitor 12. In order for this to occur, transistor 6B must appear as an open circuit during the make interval time as labeled in FIG. 2A. This is in fact what occurs at the collector of transistor 6B when the pulse train of FIG. 2A is applied to the base of transistor 6A. At the beginning of each break interval, the negative voltage swing applied to transistor 6A turns that transistor off, thereby rendering transistor 6B conductive. A short circuit discharge path to ground is thereby provided for capacitor 12 during the break interval. At the beginning of the make interval, however, the relatively positive voltage pulse at the base of transistor 6A turns transistor 6A on, thereby biasing transistor 6B off. An open circuit is thus presented to capacitor 12 during the make interval, allowing the capacitor to charge. It is of course understood that this open and short circuit approach may be achieved in a number of ways, the manner shown being merely illustrative.

When the make interval ends and the next break interval begins, transistor 6B (as indicated above) provides a short circuit to ground which continues during the break interval. This provides an immediate discharge path for capacitor 12, which fully discharges substantially immediately at the end of the make interval. The time constant of the charging circuit formed by resistors 10 and 11 and capacitor 12 (illustratively 0.5 second) is adjusted to be much greater than the make interval M (illustratively 0.04 second) so that capacitor 12 is permitted to charge for an interval that is only a small portion of this time constant. The waveform appearing across capacitor 12, and therefore at terminal 14, is the ramp function shown in solid line and labeled $(M+XM)_{CAL}$ in FIG. 2B and is linearly related to the duration of the make interval. This waveform is designated in the form $(M+XM)$ implicitly to indicate the presence of a "weighting factor" $(1+X)$ which distinguishes the slope or rate of development of the voltage corresponding to the duration of the make interval portion of the pulse from the slope of the voltage, P, which corresponds to the duration of the entire pulse. Since the duration of the make interval must always be less than that of the entire pulse, the rate of development of the voltage corresponding to the duration of the make interval is made greater than the rate of development of the voltage corresponding to the duration of the entire pulse interval so that the two developing voltages will be equal to each other at the end of the pulse interval. Thus, if the make interval is to be 40 percent of the entire pulse interval, the rate at which the voltage representing the duration of the make interval must be developed must be 2½ times the rate of development of the voltage representing the entire pulse interval.

The same dial pulse input shown in solid line in FIG. 2A is transmitted to pulser 7 in FIG. 1, which is arranged to transmit through resistor 26 to the base of transistor 25 a signal which renders transistor 25 conductive at the beginning of each break interval. (Transistor 25 is normally nonconductive by virtue of a "low" or ground signal from pulser 7.) The energization of transistor 25 provides a discharge path for the second capacitor 22 via resistor 23 and transistor 25 to ground. The value of resistor 23 is chosen to allow capacitor 22 to discharge very rapidly. When capacitor 22 charges up thereafter, it does so for substantially the entire break and make intervals. When the output from pulser 7 terminates, transistor 25 is biased off. Capacitor 22 now begins to charge from positive battery through resistors 24 and 23. Since only the beginning of a break interval causes pulser 7 to trigger transistor 25 and thus discharge capacitor 22, that capacitor continues to charge throughout the remainder of the break interval and for the entire make interval. Transistors 20 and 19 are normally "on" during the charging interval of capacitor 22 and act primarily as large buffer resistances to couple capacitor 22's voltage charging waveform to the second terminal 18. This waveform is denominated as the waveform P in FIG. 2C.

The calibration of the upper half of this circuit is easily accomplished by variation of adjustable resistor 10. This controls the slope of the $M+XM$ waveform (see FIG. 2B) and since the ramp portion of that waveform terminates abruptly with the end of the make interval, the peak magnitude of the $M+XM$ waveform is also thereby affected. The scheme utilized by the invention is to equalize the peak magnitudes of the $M+XM$ and P waveforms when an "ideal" calibration dial pulse train from calibration source 4 is the input to the circuit. That is, referring to FIGS. 2B and 2C, assuming an ideal input having the desired minimum percent break of 60 percent, resistor 10 is adjusted so that the magnitude ($V_c$) of the $(M+XM)_{CAL}$ waveform equals the magnitude ($V_c$) of the P waveform at the end of the make interval.

Expressing this in terms of the FIG. 1 hardware, the magnitude of the voltage waveform at terminal 14 is adjusted so that it barely exceeds that of the voltage waveform at terminal 18 at the end of the make interval, thereby turning on transistor 15. (In actual practice, this voltage may vary from 0.2 to 0.9 volts, but is a constant for a particular transistor.) It can now be said that the upper half of the circuit is calibrated to give an alarm indication if percent breaks below the acceptable minimum of 60 percent are transmitted to the circuit from a source 3 of dial pulses to be tested. That a comparison of the $M+XM$ and P waveforms results in a minmum tolerance limit for the parameter of percent break (B/P), is demonstrated by the inequality calculations shown hereinbelow, wherein P equals the total pulse duration (the sum of the make and break intervals), M equals the make interval, and B equals the break interval:

*Minimum percent break*

$$M+XM\geq P$$
$$M(1+X)\geq P$$
$$(P-B)\ (1+X)\geq P$$
$$P-B+XP-XB\geq P$$
$$XP\geq B(1+X)$$
$$\frac{B}{P}\leq\frac{X}{1+X}$$

The X factor in the above expression is determined by adjustment of variable resistor 10. The X factor is equivalent to a resistance ratio based on the values of resistors 10 and 11. If $R_{10}$ and $R_{11}$ are the resistance values of resistors 10 and 11 (with resistor 10 completely in the circuit), and R is the summation of the resistances when $R_{10}$ is reduced during calibration, X equals $$\frac{R_{10}+R_{11}}{R}-1$$

Since R can never go below $R_{11}$ (thereby preventing X from going to infinity since resistor 11 is fixed), X can vary as high as $$\frac{R_{10}+R_{11}}{R_{11}}-1=\frac{R_{10}}{R_{11}}$$

The minimum value for X is, of course, zero, when $R=R_{10}+R_{11}$. It is noted that a minimum percent break of $$\frac{X}{1+X}$$

(expressed in percent) is established as a function of X, which in turn is dependent on the settings of resistor 10. With X varying as noted earlier, any limits for minimum percent break can be established. Merely by way of illustration, if fixed resistor 11 is 25 kilohms and resistor 10 is variable between 0 and 75 kilohms, X varies between 0 and 3. The percent break limit may therefore be set at any value between 0 and 75 percent.

Similarly, with respect to maximum percent break and the lower half of the circuit of FIG. 1, the inequality calculations can be shown to provide a maximum percent break limit based on a comparison of the $B+XB$ and P waveforms:

*Maximum percent break*

$$B+XB\geq P$$
$$B(1+X)\geq P$$
$$\frac{B}{P}\geq\frac{1}{1+X}$$

In the above expressions, it is noted that a maximum percent break "ceiling" of $$\frac{1}{1+X}$$

(expressed in percent) is established as a function of X, which in turn is proportional to the adjustment of resistor 30. Assuming the same values for resistors 30 and 31 as for resistors 10 and 11 above, this ceiling can be varied from 25 to 100 percent.

To illustrate the manner in which the circuit actually operates, again with reference to the upper half of the circuit of FIG. 1, assume a dial pulse input from source 3 to elements 6A and 7, including at least one "dial pulse" (i.e., make and break intervals together) where the actual percent break is an "unacceptable" 50 percent (based on a calibrated minimum of 60 percent). This is shown by the dotted lines in FIG. 2A with respect to all of the dial pulses in the pulse train to be tested. However, it should be clearly understood that even if only one of the three pulses shown in FIG. 2A were unacceptable, the circuit would have no difficulty in detecting such an error. In any case, as recited before with respect to the calibration cycle, transistor 6B appears as a short circuit to capacitor 12 during the break interval and as an open circuit to capacitor 12 during the make interval. Thus, capacitor 12 (and therefore terminal 14) has exhibited thereacross the waveform labelled $(M+XM)_{test}$ shown in dotted fashion in FIG. 2B. Although the slope of the ramp portion of that waveform is the same as that for the $(M+XM)_{cal}$ waveform since the time constant is the same, the magnitude of the $(M+XM)_{test}$ waveform is greater because it begins to charge "up the ramp" at an earlier point in time due to the assumed violation of the minimum percent break limit recited above. However, at the same time, the P waveform appearing at terminal 18 is practically the same as that which appeared there during calibration (the time constant is the same and assumedly the total pulse duration is also the same). Thus, the P waveform reaches the same peak magnitude $V_c$ as before. Since the $(M+XM)_{test}$ waveform goes as high as $V_a$ in FIG. 2B, the voltage at terminal 14 exceeds that at terminal 18 by an amount sufficient to forward bias comparator transistor 15 and turn it on. In fact, the magnitude of the $(M+XM)_{test}$ waveform can exceed that of the P waveform so as to turn on transistor 15 prior to the end of the make interval. As shown in FIGS. 2B and 2C, for example, the test voltage $V_t$ exceeds the corresponding P waveform voltage $V_p$ at the instant of time labelled *t*, at which time transistor 15 is energized. This is the alarm condition referred to earlier.

Alarm OR gate 50 is arranged to pass a particular level alarm signal from either lead 51 or 52 to alarm lead 53 based upon the energization of either one of comparator transistors 15 or 35. The specific arrangement used is based upon the voltage divider action related to the ratio of resistors 16 and 17. When transistor 15, for example, turns on, the voltage across resistor 16 drops from $V_{D1}$ to a level proportional to the ratio of resistor 16 to the total resistance formed by the sum of resistances 16 and 17. By proper selection of voltage source $V_{D1}$ and resistors 16 and 17 as is well known, it can be arranged to give an appropriate alarm signal to OR gate

50 when the comparator transistors turn on. Reset lead 54 is normally provided with a grounded path in the reset circuit (not shown), and this provides a current path allowing the voltage division to take place.

The lower half of the circuit, relating to maximum per cent break, operates in a manner corresponding to that described above, except that transistor 8 bears an "opposite" relationship to charging capacitor 32 as compared with the relationship between transistor 6A and 6B and capacitor 12. That is, as can be observed from FIGS. 2D and 2E, transistor 8 must and does show an open circuit to capacitor 32 during the lower level break interval, thereby allowing capacitor 32 to charge during the break interval, while presenting a short circuit to capacitor 32 during the upper level make interval, thereby providing a discharge path during the make interval. In addition, pulser 9 is arranged to turn transistor 45 on to discharge capacitor 42 at the beginning of the make interval. This permits an appropriate comparison to be made between the $B+XB$ and P waveforms at the end of the break interval.

It is to be understood that the above-described arrangements are illustrative of the application of the principles of the invention. Numerous other arrangements may be devised by those skilled in the art without departing from the spirit and scope of the invention.

What is claimed is:

1. Apparatus for checking each pulse of a continuous series of pulses where each pulse has at least two identifiable portions comprising means for generating at least two signals for each pulse, one signal representing the continuance of one of said portions, another signal representing the continuance of all of said portions, comparator means, and circuit means for simultaneously applying said one and said another signal representing each pulse to said comparator means successively for each pulse and for applying said signals to said comparator means at different rates.

2. Apparatus according to claim 1 wherein said circuit means applies said one signal at a greater rate than said another signal.

3. Apparatus according to claim 1 wherein said circuit means includes at least one path having an adjustable time constant.

4. Apparatus according to claim 3 wherein said comparator means is amplitude sensitive and wherein said generating means produces constant amplitude signals.

5. Apparatus according to claim 4 wherein said circuit means applies said one of said signals to said comparator means at a greater amplitude rate than said another of said signals.

6. A test circuit comprising a source of a continuous series of signals to be measured, means responsive to each signal from said source for producing a plurality of outputs, a comparator having a plurality of terminals, means for presenting a first waveform derived from a first of said outputs to one of said terminals, means for presenting a second waveform derived from a second of said outputs to another of said terminals, wherein said comparator is arranged to be energized if said first waveform exceeds said second waveform in magnitude, and alarm means responsive to the energization of said comparator.

7. A pulse checking circuit for testing that each of a continuous series of dial pulses falls within acceptable minimum and maximum percent break limits comprising means for generating first and second voltages proportional, respectively, to the make and break intervals of each one of said pulses, means for generating a third voltage proportional to the total interval of each one of said pulses, alarm means, and means for instantaneously comparing said first and said second voltages with said third voltage and for activating said alarm means if either of said first and second voltages exceeds said third voltage.

8. A pulse checking circuit in accordance with claim 7 wherein said first and said second voltages are generated at a rate greater than the rate of generation of said third voltage.

9. A dial pulse testing circuit for checking the minimum and maximum per cent break of each pulse of a continuous series of dial pulses comprising first means for producing a linearly increasing voltage during the make interval of each one of said pulses, second means for producing a linearly increasing voltage during the sum of the make and break intervals of each one of said pulses, first semiconductor comparison means triggerable when the voltage produced by said first means exceeds the voltage produced by said second means for any one pulse, and alarm means responsive to the triggering of said comparison means to indicate a percent break less than said minimum percent break.

10. A dial pulse testing circuit in accordance with claim 9 further including third means for producing a linearly increasing voltage during the break interval of each pulse, fourth means for producing a linearly increasing voltage during the sum of the make and break intervals of each pulse, and second semiconductor comparison means triggerable when the voltage produced by said third means exceeds the voltage produced by said fourth means for activating said alarm means to indicate a percent break greater than said maximum percent break.

11. A circuit in accordance with claim 10 wherein each of said first, second, third and fourth voltage producing means includes a chargeable capacitor.

12. A pulse checking circuit for testing that a particular portion of each pulse of a continuous series of pulses has a time duration which falls within acceptable maximum and minimum percent limits comprising means for generating a waveform for each pulse proportional in magnitude to the time duration of the particular portion of said pulse, means for generating a waveform for each pulse proportional in magnitude to the total time duration of said pulse, means for adjusting the rate of development of at least one of said waveforms, and means for comparing the magnitudes of said waveforms at a predetermined time for each pulse.

13. A testing circuit comprising a source of a continuous series of calibrating pulses, a source of a continuous series of pulses to be tested, a first charging circuit operable during the make interval of each pulse from either of said sources, a second charging circuit having a linear voltage buildup occurring throughout the sum of the make and break intervals of each pulse, means for selectively connecting said sources of pulses to said charging circuits, means for adjusting said first charging circuit to have a linear voltage buildup equalized in magnitude to said buildup of said second charging circuit at the end of each pulse while said source of calibrating pulses is connected to said charging circuits, means for comparing said voltage buildups, and means responsive to the voltage buildup of said first charging circuit exceeding the voltage buildup of said second charging circuit for any one pulse to furnish an alarm indication.

References Cited

UNITED STATES PATENTS

| | | | |
|---|---|---|---|
| 1,759,837 | 5/1930 | Brown | 179—175.2 |
| 2,416,102 | 2/1947 | Kessler | 179—175.2 |
| 2,428,488 | 10/1947 | Ghormley | 179—175.2 |
| 2,486,172 | 10/1949 | Kessler | 179—175.2 |
| 2,684,409 | 7/1954 | Kessler | 179—175.2 |
| 2,826,648 | 3/1958 | Kessler | 179—175.2 |

KATHLEEN H. CLAFFY, *Primary Examiner.*

A. A. McGILL, *Assistant Examiner.*